United States Patent [19]

Latsko

[11] Patent Number: 5,057,178
[45] Date of Patent: Oct. 15, 1991

[54] METHOD OF MAKING A COUPLING COMPONENT BY EXPANDING AND VULCANIZING A TUBE DIRECTLY ONTO FRICTION SHOE ASSEMBLIES

[75] Inventor: James M. Latsko, North Royalton, Ohio

[73] Assignee: Eaton Corporation, Cleveland, Ohio

[21] Appl. No.: 520,223

[22] Filed: May 9, 1990

[51] Int. Cl.$^5$ ............................................. B29C 49/20
[52] U.S. Cl. .................... 156/245; 156/156; 192/88 B; 264/516; 425/501; 425/503
[58] Field of Search ............... 264/516, 515, 523, 315; 425/503, 501, 525, 112, 44, 45; 156/583.3, 285, 245, 156; 192/88 B; 188/366, 367

[56] References Cited

U.S. PATENT DOCUMENTS

| | | | |
|---|---|---|---|
| 2,418,099 | 3/1947 | Schmitter et al. | 192/107 |
| 2,625,711 | 1/1953 | Fawick | 18/35 |
| 2,639,466 | 5/1953 | Glynn | 425/44 |
| 3,022,877 | 2/1962 | Fawick | 192/88 |
| 3,092,231 | 6/1963 | Kneuss | 192/107 |
| 3,558,754 | 1/1971 | Martin | 264/516 |
| 3,924,981 | 12/1975 | Sarumaru | 425/44 |
| 4,190,136 | 2/1980 | Collins et al. | 188/367 |
| 4,342,799 | 8/1982 | Schwochert | 264/516 |
| 4,692,362 | 9/1987 | Johnson | 156/198 |
| 4,795,013 | 1/1989 | Latsko | 192/88 B |

FOREIGN PATENT DOCUMENTS

| | | | |
|---|---|---|---|
| 2429449 | 1/1976 | Fed. Rep. of Germany | 425/501 |
| 57-077537 | 5/1982 | Japan | 264/516 |
| 57-210840 | 12/1982 | Japan | 264/516 |
| 58-181617 | 10/1983 | Japan | 264/516 |
| 60-417320 | 8/1985 | Japan | 264/516 |
| 62-108025 | 5/1987 | Japan | 264/516 |

OTHER PUBLICATIONS

Drawing of a Rim and Tube Assembly.

Primary Examiner—Jan H. Silbaugh
Assistant Examiner—Catherine Timm
Attorney, Agent, or Firm—Tarolli, Sundheim & Covell

[57] ABSTRACT

An improved coupling component includes an annular tube which is inflatable to move friction shoe assemblies into engagement with another component of a coupling. Elastomeric mounting material is connected with the tube and is molded in place against the friction shoe assemblies. The molded elastomeric mounting material extends around torque transmitting elements, such as pins, connected with backing plate of the friction shoe assemblies to connect the elastomeric mounting material with the friction shoe assemblies. When the coupling component is to be constructed, the tube and a plurality of friction shoe assemblies are placed in a mold. The tube is then expanded under the influence of fluid pressure to press elastomeric mounting material against the friction shoe assemblies. Upon application of heat, the elastomeric mounting material is molded around torque transmitting elements connected with the friction shoe assemblies.

28 Claims, 7 Drawing Sheets

METHOD OF MAKING A COUPLING COMPONENT BY EXPANDING AND VULCANIZING A TUBE DIRECTLY ONTO FRICTION SHOE ASSEMBLIES

BACKGROUND OF THE INVENTION

The present invention relates to a coupling component in which a tube element is expanded to press friction shoe assemblies against a second coupling component.

Known coupling assemblies, such as a brake or clutch, include a coupling component having an inflatable annular tube which is mounted on a rigid annular rim. A plurality of friction shoe assemblies are connected with the tube in an annular array. When fluid pressure is conducted to the tube, the tube is expanded to press the friction shoe assemblies against another coupling component to interconnect the two coupling components. Coupling components having this general construction and mode of operation are disclosed in U.S. Pat. Nos. 3,022,877; 3,092,231; 4,190,136; and 4,795,013.

Coupling components having this construction have previously been made by a method which includes placing the inflatable annular tube in a mold, inflating the tube, and heating the mold to vulcanize the elastomeric material of the tube. The tube is then removed from the mold and friction shoe assemblies are connected with the tube. Friction shoe assemblies have previously been connected with the tube by inserting pins through holes or passages formed in the tube during vulcanizing of the elastomeric material. The ends of the pins are received in openings formed in flanges on backing plates of the friction shoe assemblies. Releasable retainers, such as wires, are used to prevent the pins from becoming disengaged from the backing plates of the friction shoe assemblies.

When the friction shoe assemblies are connected with the tube by releasable pins or other types of torque transmitting elements, the friction shoe assemblies can be replaced when they become worn. However, a known coupling component has friction shoes which are bonded directly to the tube during the molding process. Thus, the inflatable tube is placed in the mold. The friction shoes are placed in an annular array in the mold with the friction shoes toward the tube. The tube is inflated and the mold heated to vulcanize the material of the tube and bond the tube with the friction shoes. Since the friction shoes are bonded with the tube, they cannot be replaced when they become worn.

SUMMARY OF THE INVENTION

The present invention provides an improved method of forming an improved coupling component having a plurality of friction shoe assemblies connected with an inflatable tube by torque transmitting elements. When the coupling component is to be constructed, the tube is placed in a mold. A plurality of friction shoe assemblies are placed in the mold with torque transmitting elements on the friction shoe assemblies adjacent to mounting material.

After the tube and friction shoe assemblies have been placed in the mold and the mold closed, fluid pressure is utilized to expand the tube and press the mounting material against the torque transmitting elements connected with the friction shoe assemblies. The mounting material is molded around the torque transmitting elements to interconnect the friction shoe assemblies and tube.

Accordingly, it is an object of this invention to provide a new and improved method of forming a coupling component having a plurality of friction shoe assemblies connected with an inflatable tube by torque transmitting elements and wherein the tube is expanded to effect a molding of mounting material around the torque transmitting elements connected with the friction shoe assemblies during fabrication of the coupling component.

Another object of this invention is to provide a new and improved coupling component having a plurality of friction shoe assemblies which are connected with the tube by releasable connectors and wherein mounting material connected with the tube is molded in place against the back of the friction shoes and around the releasable connectors.

BRIEF DESCRIPTION OF THE DRAWINGS

The foregoing and other objects and features of the invention will become more apparent upon a consideration of the following description taken in connection with the accompanying drawings, wherein.

DESCRIPTION OF SPECIFIC PREFERRED EMBODIMENTS OF THE INVENTION

Coupling Component

Figure 1:
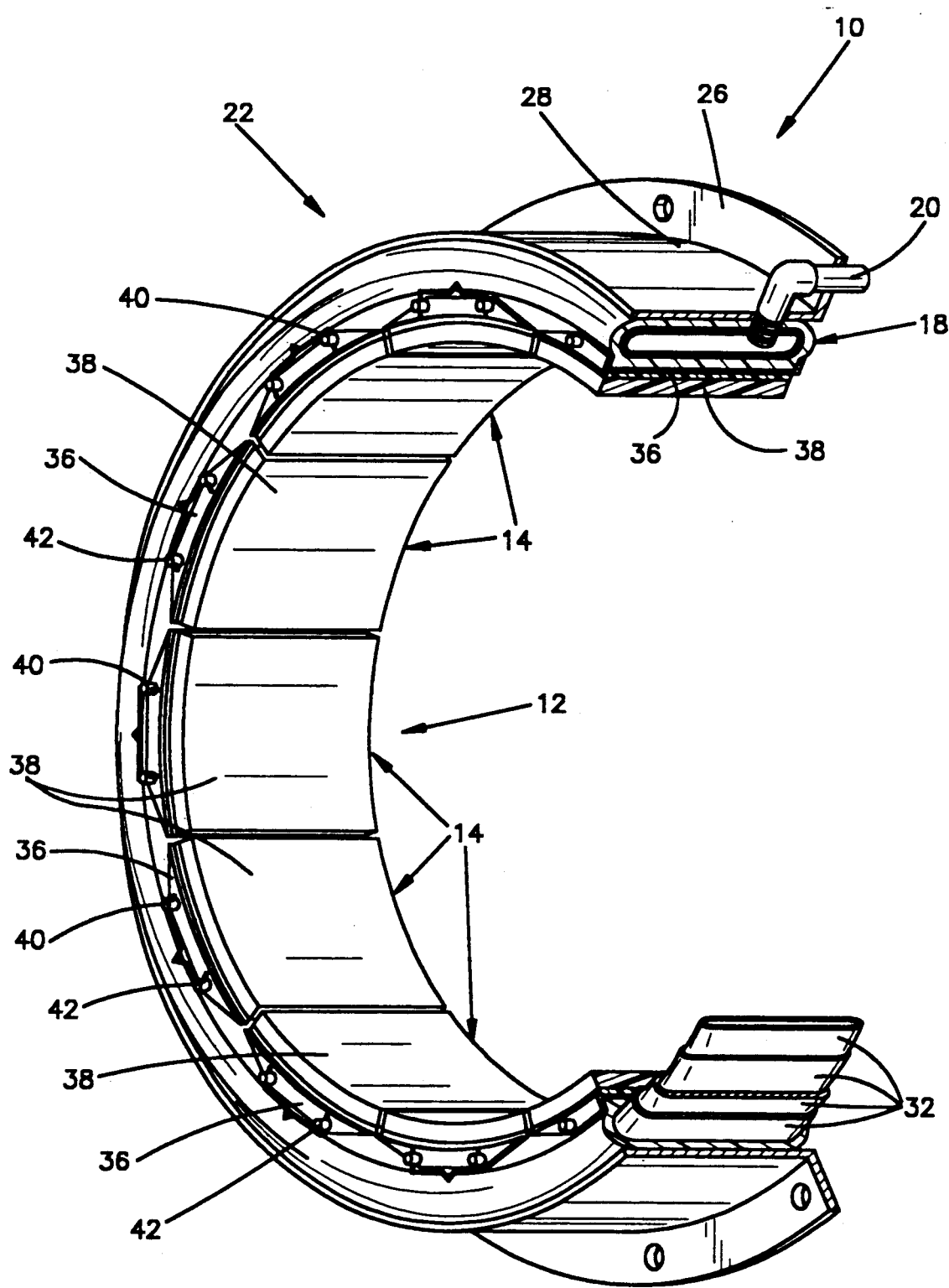
FIG. 1 is a partially broken away pictorial illustration of a coupling component constructed in accordance with the present invention and illustrating the relationship between an annular rim, an inflatable annular tube, and an annular array of friction shoe assemblies releasably connected with the tube.

A coupling component 10 (FIG. 1), constructed in accordance with the present invention, includes an annular array 12 of friction shoe assemblies 14. The friction shoe assemblies 14 are engageable with the outside of a drum or second coupling component (not shown) to interconnect the two coupling components. The coupling component 10 could function as part of either a brake or a clutch.

The friction shoe assemblies 14 are moved into engagement with the drum by radial expansion of an inflatable tube 18. Thus, when fluid pressure, such as air pressure, is conducted through a conduit 20 to the annular tube 18, the tube expands radially inwardly. This causes the tube 18 to press the friction shoe assemblies 14 against the drum. The friction between the shoe assemblies 14 and drum interconnect the drum and the coupling component 10.

A rigid annular metal rim 22 is connected with the inflatable tube 18. The rim 22 has an annular mounting flange 26 which is used to connect the coupling component 10 with an associated apparatus. The rim has a cylindrical web 28 with a radially inner side surface which is bonded to a radially outer side wall portion of the tube 18.

Upon inflation of the tube 18 to press the friction shoes 14 against a drum or other coupling element, torque is transmitted between the friction shoe assemblies and the rim 22. In order to enable the tube 18 to withstand relatively large torque forces, reinforcing plies 32 are provided in the tube. The reinforcing plies 32 are surrounded by elastomeric mounting material, such as either natural or synthetic rubber.

Each of the friction shoe assemblies 14 includes a rigid metal backing or base plate 36. A rectangular friction pad 38 is securely connected to the backing plate 36. Torque transmitting elements 40 and 42 interconnect the tube 18 and the backing plates 36. The torque transmitting elements 40 and 42 have surface areas which face circumferentially relative to the annular array 12 of friction shoe assemblies 14. The torque transmitting elements 40 and 42 transmit force from the backing plates 36 to the tube 18 when the coupling component 10 is engaged with another coupling component. In the illustrated embodiment of the invention, the torque transmitting elements 40 and 42 are pins. The metal pins 40 and 42 are releasably connected with flanges on the backing plates 36 of the friction shoe assemblies 14. The releasable pins 40 and 42 enable the friction shoe assemblies 14 to be replaced when the friction pads 38 become worn.

The pins 40 and 42 extend through the elastomeric mounting material connected with the tube 18 and through openings in the flanges on the metal backing plates 36. Therefore, the pins 40 and 42 interconnect the tube 18 and friction shoe assemblies 14. The metal pins 40 and 42 have surface areas which extend transversely to the backing plates 36 and face circumferentially of the annular array 12 of friction shoe assemblies 14. These surface areas press against the elastomeric mounting material to transmit torque from the friction shoe assemblies 14 to the tube 18. Suitable retainers, such as snap rings or wires, are used to releasably hold the pins 40 and 42 in place on the backing plates 36.

Although the pins 40 and 42 are used as torque transmitting elements in the illustrated embodiment of the invention, it should be understood that the friction shoes could be provided with other known torque transmitting elements if desired. The other known torque transmitting elements could be used either separately or in combination with the pins 40 and 42. Thus, a drive bar could be used in conjunction with the pins 40 and 42 in the manner disclosed in U.S. Pat. No. 4,795,013. Torque transmitting assemblies having the construction shown in U.S. Pat. Nos. 3,022,877 and 4,190,136 could be used if desired.

In accordance with a feature of the invention, elastomeric mounting material connected with the tube 18 is molded in place against the backing plate 36 and around the torque transmitting elements or pins 40 and 42. By molding the elastomeric mounting material against the side surface of the backing plate 36 opposite from the friction pad 38, a good fit is obtained between the backing plate and the elastomeric mounting material. By molding the elastomeric mounting material around the cylindrical outer side surfaces of the pins 40 and 42, the elastomeric mounting material obtains a secure grip on the pins to interconnect the friction shoe assemblies 14 and the tube 18. If a torque transmitting element other than the pins 40 and 42 is used, the elastomeric mounting material can be molded around or at least part way around, this torque transmitting element in much the same manner as in which it is molded around the pins.

Fabrication of Coupling Component

To fabricate the coupling component 10, the tube 18 and friction shoe assemblies 14 are placed in a multi-part mold 48 (FIGS. 2-6). The annular tube 18 is expanded to press elastomeric mounting material against the friction shoe assemblies 14. As the elastomeric mounting material is pressed against the friction shoe assemblies 14 by the tube 18, the mold 48 is heated. The heated elastomeric mounting material is molded against the backing plates 36 and around the torque transmitting elements or pins 40 and 42 of the friction shoe assemblies. It should be noted that the reinforcing plies 32 have not been shown in FIGS. 2, 3, 5 and 6 for purposes of clarity of illustration.

When the fabrication of the coupling assembly 10 is to be undertaken, an annular bottom section 52 (FIG. 2) of a multi-part mold assembly 48 is supported on a horizontal surface. Therefore, the central axis of the annular metal bottom section 52 will be vertical and offset to the right as viewed in FIG. 2. An annular metal bottom ring 54 is placed on the bottom section 52 of the mold.

Figure 2:
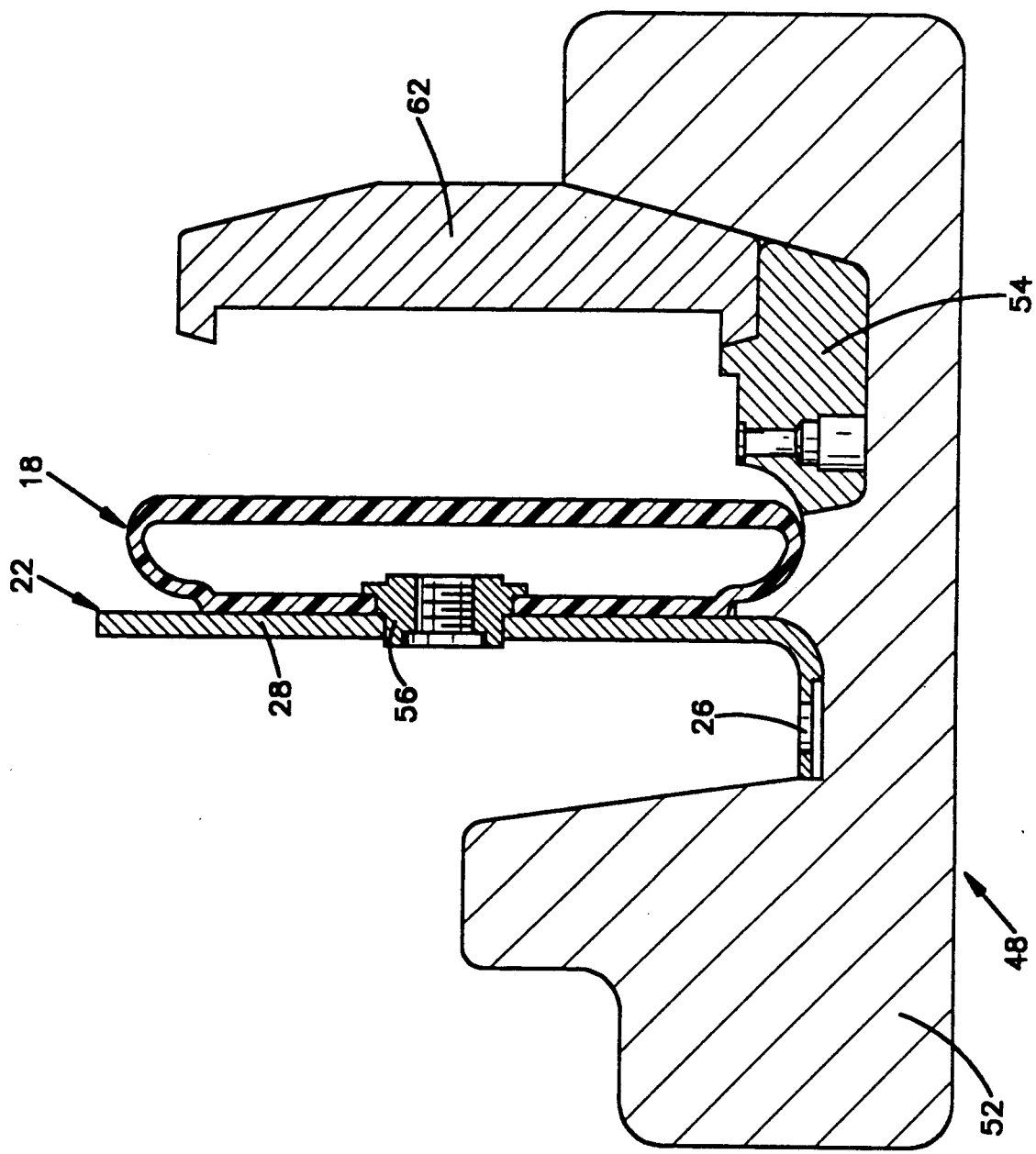
FIG. 2 is a fragmentary sectional view illustrating the manner in which the rim and inflatable tube are positioned in a mold during fabrication of the coupling component of FIG. 1.

Before the tube 18 is placed in the mold 48, the tube is mounted on the annular rim 22. At this time, the tube 18 is uncured and is held in place by an internally threaded connector member 56. Once the tube 18 has been mounted on the metal rim 22, the tube and rim are placed in the bottom section 52 of the mold (FIG. 2). At this time, the central axes of the annular rim 22 and tube 18 will be coincident with the vertical central axis of the bottom section 52 of the mold. A metal inner ring 62 is also placed in the bottom section 52 of the mold. The annular inner ring 62 has a central axis which is coincident with the central axis of the bottom section 52 of the mold 48.

Figure 3:
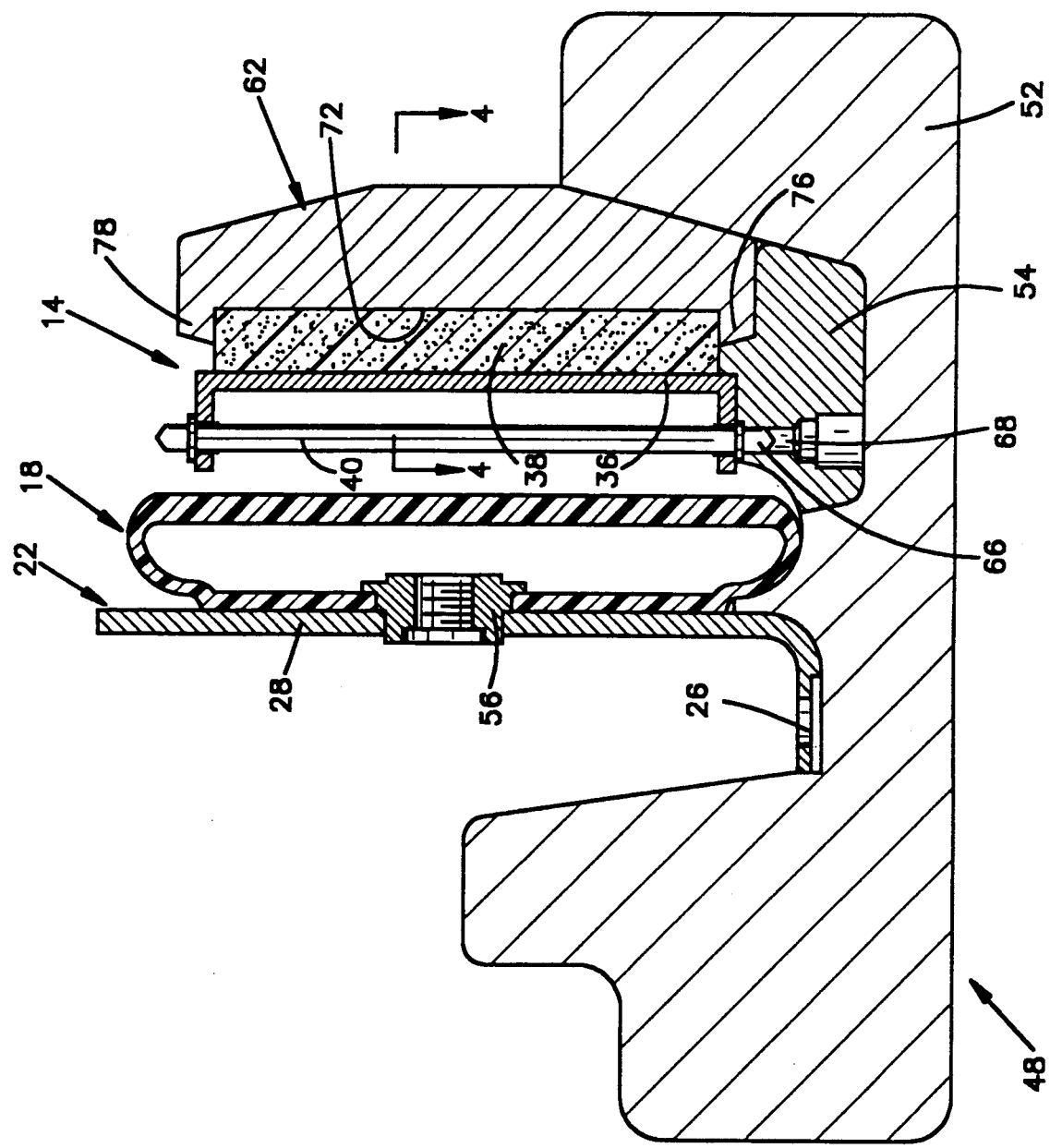
FIG. 3 is a sectional view, generally similar to FIG. 2, illustrating the manner in which friction shoe assemblies are placed in the mold.

After the relatively bulky tube 18, rim 22, and inner ring 62 have been placed in the bottom section 52 of the mold 48, the friction shoe assemblies 14 are placed in an annular array in the mold (FIG. 3). The end portions of the torque transmitting elements or pins 40 engage openings in the bottom ring 54 to locate the friction shoe assemblies relative to the inner ring 62 and tube 18. Thus, the lower end portion 66 of each of the pins 40 engages a cylindrical locating hole or opening 68 in the bottom ring 54. Similarly, the lower end portions of the pins 42 of the friction shoe assembly 14 engage holes or openings in the bottom ring 54. The openings 68 in the bottom ring 54 receiving the pins 40 and 42 are located so that the friction shoe assemblies 14 are disposed in an annular array with equal spacing between the ends of the friction shoe assemblies, in much the same manner as shown in FIG. 1.

Figure 4:
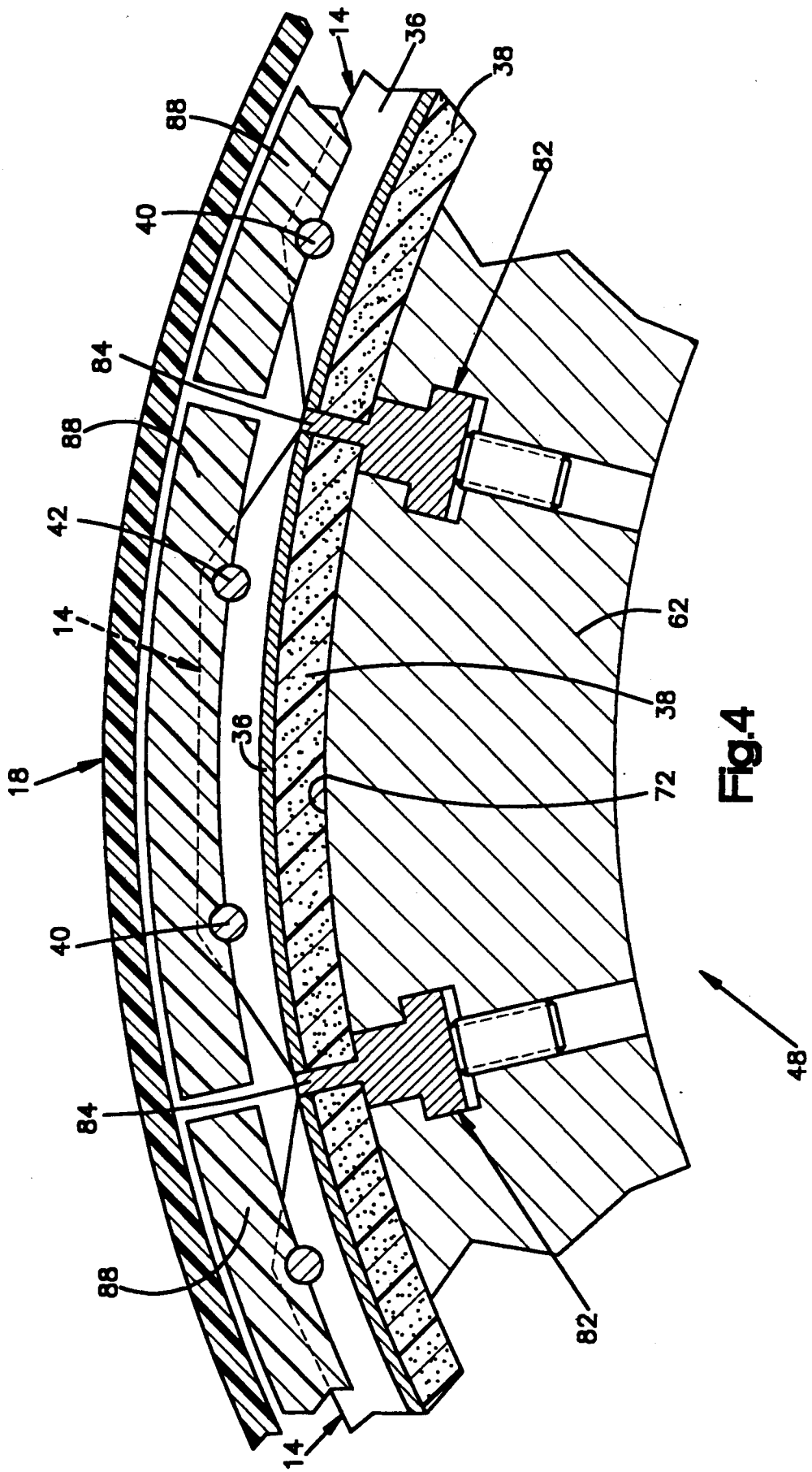
FIG. 4 is a fragmentary sectional view, taken generally along the line 4—4 of FIG. 3, illustrating the manner in which elastomeric mounting material is placed between the friction shoe assemblies and the inflatable tube.

A friction pad 38 (FIG. 3) on each of the friction shoe assemblies 14, abuttingly engages a convex cylindrical outer side surface 72 on the inner ring 62 (FIGS. 3 and 4). A pair of annular side sections 76 and 78 (FIG. 3) on the inner ring 62 engage opposite sides of the friction pads 38. The side sections 76 and 78 further locate the friction shoe assemblies 14 and hold them in place.

A plurality of metal ribs or spacer blocks 82 (FIG. 4) are provided in the inner ring 62. The spacer blocks 82 project radially outwardly from the annular rim 62 and extend between the friction shoe assemblies 14. The evenly spaced metal blocks 82 locate the friction shoe assemblies relative to each other and to the inner ring 62.

The spacer blocks 82 have end portions or ribs 84 which extend across the width of the ends of the friction shoe assemblies 14 The ribs 84 block elastomeric mounting material from flowing into spaces between the ends of the friction shoe assemblies 14. This results in gaps being provided between the ends of the friction shoe assemblies 14 The gaps between friction shoe assemblies 14 (FIG. 1) enable the friction shoe assemblies to move toward each other when the tube 18 is inflated and expanded radially inwardly.

Once the friction shoe assemblies 14 have been located in the bottom section 52 of the mold 48, additional elastomeric mounting material 88 (FIGS. 4 and 5) is required in the mold between the friction shoe assemblies 14 and tube 18. The additional uncured elastomeric material 88 provides the necessary volume of elastomeric mounting material to flow around the torque transmitting elements or pins 40 and 42 The elastomeric mounting material 88 is also molded against the metal backing plate 36 of the friction shoe assembly 14. If desired, the elastomeric mounting material 88 could be placed in the mold 48 in conjunction with the tube 18 or placed in the mold 48 separately, or in conjunction with the friction shoe assemblies 14.

In the illustrated embodiment of the invention, the additional elastomeric mounting material 88 is provided in the form of blocks. The blocks 88 of uncured elastomeric material have a generally rectangular configuration and extend across the pins 40 and 42 of the friction shoe assemblies. The blocks 88 of elastomeric mounting material have recesses for receiving the pins 40 and 42. If desired, the blocks 88 of elastomeric mounting material could be provided with relatively deep grooves for the pins 40 and 42 to enable the material to extend further into the space between pins The blocks 88 of elastomeric mounting material could be placed in the mold 48 separately from the friction shoe assemblies 14, or the friction shoe assemblies could be mounted on the blocks of material and then placed in the mold.

Although the additional elastomeric mounting material 88 could be provided in blocks, the additional elastomeric mounting material could also be provided in a single elongated strip of material. The elongated strip of uncured elastomeric mounting material would have a rectangular cross sectional configuration and would be placed in the mold 48 between the tube 18 and friction shoe assemblies 14. The strip of elastomeric mounting material would be long enough to form a complete ring or circle extending around the annular array of friction shoe assemblies 14.

The strip of elastomeric mounting material 88 could be provided with recesses for receiving the pins 40 and 42 of the various friction shoe assemblies 14. If desired, the friction shoe assemblies 14 could be mounted on the strip of elastomeric mounting material and then placed in the mold 48 with the strip of material. For example, the friction shoe assemblies 14 could be strung on a thin strip of elastomeric mounting material 88 which extends between the backing plates 36 and the pins 40 and 42 of the friction shoe assemblies If desired, an additional strip of elastomeric mounting material 88 could be provided between the tube 18 and the pins 40 and 42.

When the additional elastomeric mounting material 88 is supplied integrally with the tube 18, the annular inner portion of the side wall of the tube 18 would be formed with a greater radial thickness of uncured elastomeric mounting material than the rest of the tube. This would result in the one wall of the tube 18 having a strip of extra elastomeric mounting material extending around the annular array of friction shoe assemblies 14. The additional elastomeric mounting material connected with the radially inner portion of the tube 18 may be provided with recesses to receive the pins 40 and 42. Thus, the radially inner portion of the side wall of the tube 18 could be integrally formed with the additional elastomeric mounting material 88 rather than being formed separately from the elastomeric mounting material as shown in FIG. 5.

After the additional elastomeric mounting material 88 has been placed in the mold 48, an annular metal top ring 92 is positioned over the friction shoe assemblies 14 opposite from the annular bottom ring 54. The annular top ring 92 is provided with pin receiving holes or openings 94 which are disposed axially opposite from and aligned with the pin receiving openings in the bottom ring 54. Thus, the upper end portion 96 of the pin 40 extends into an opening 94 in the top ring 92 to further locate the friction shoe assembly 14 and hold the friction shoe assembly in place.

Figure 5:
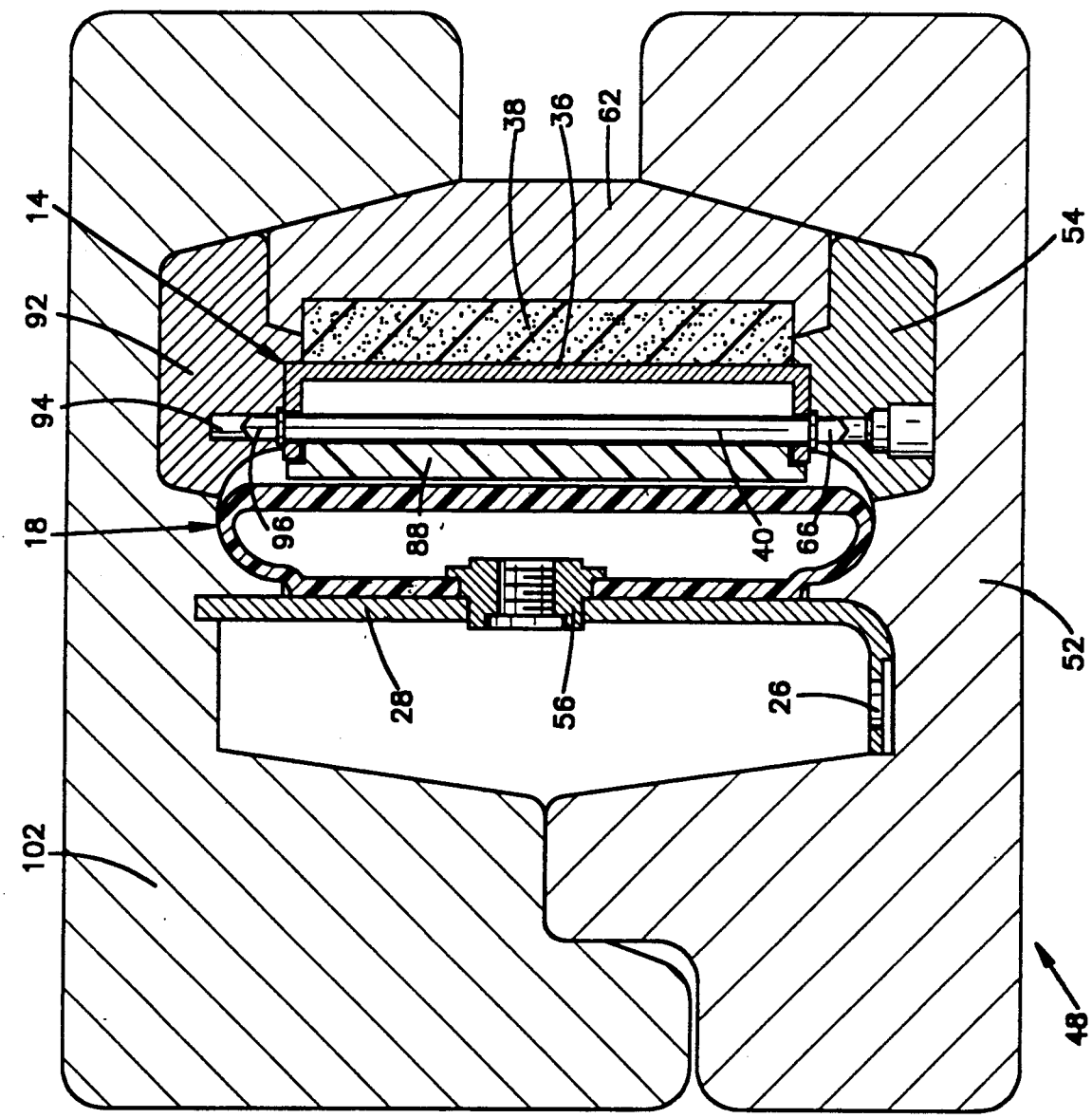
FIG. 5 is a sectional view, generally similar to FIG. 3, further illustrating the manner in which elastomeric mounting material is placed in the mold between the friction shoe assemblies and the inflatable tube and illustrating the manner in which an upper mold section cooperates with a lower mold section to close the mold.

A metal annular top section 102 is then placed over the top ring 92 and the upper end portions of the tube 18, rim 22, and inner ring 62 (FIG. 5). The top section 102 cooperates with the inner ring 62 and bottom section 52 of the multi-part mold 48 to close the mold. The bottom and top sections 48 and 102 of the mold are fixedly interconnected to hold the components of the mold 48, the friction shoe assemblies 14, and the rim 22 against movement relative to each other.

Once the mold 48 has been closed in the manner previously explained, high pressure fluid (air) is conducted through the fitting 56 into the tube 18. This fluid pressure causes the tube 18 to expand radially inwardly and press against the additional elastomeric mounting material 88. While fluid pressure is maintained in the tube 18, the mold 48 is heated.

Figure 6:
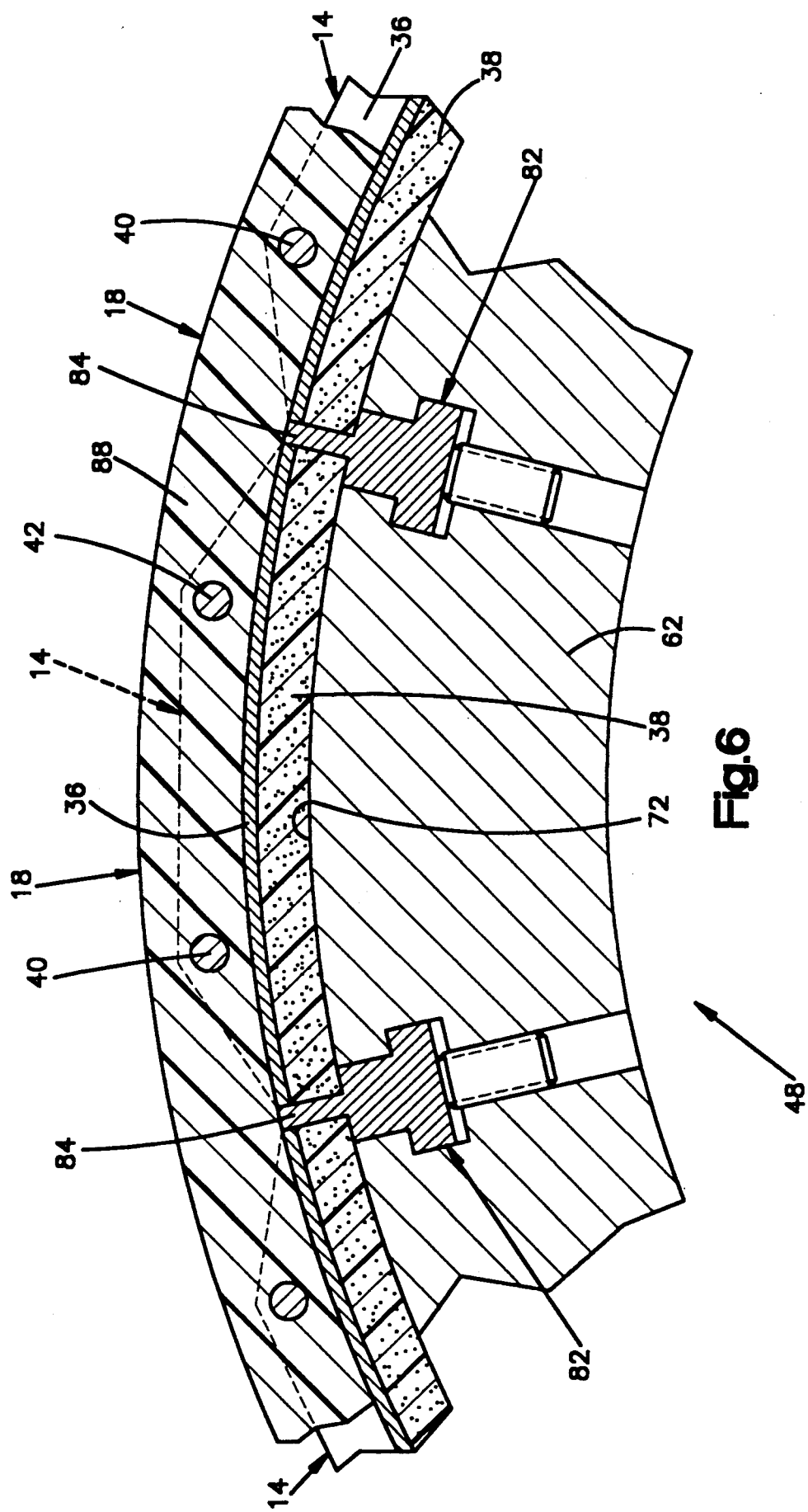
FIG. 6 is a fragmentary sectional view, generally similar to FIG. 4, illustrating the manner in which the elastomeric mounting material is molded around torque transmitting pin elements of the friction shoe assemblies.

The mold 48 may be heated by conducting steam through passages in the mold or by placing the mold between heated platens of a press. As the mold 48 is heated, the elastomeric mounting material 88 is softened and flows around the pins 40 and 42 (FIG. 6). In addition, the elastomeric mounting material 88 is pressed against the backing plates of the friction shoe assemblies 14.

This results in a molding of the elastomeric mounting material 88 against the friction shoe assemblies 14 and around the torque transmitting elements or pins 40 and 42 in the manner shown in FIG. 6. Due to the heat and pressure, the additional elastomeric mounting material 88 bonds with the elastomeric mounting material of the tube 18. The elastomeric mounting material of the tube 18 bonds to the rim 22. As the heat and pressure are maintained, the elastomeric mounting material 88 completely fills all of the space between the tube 18 and friction shoe assemblies 14.

As initially placed in the mold 48, the elastomeric mounting material of the tube 18 and the extra elastomeric mounting material 88 are uncured. Continued application of heat and pressure to the elastomeric mounting material results in vulcanization of the uncured elastomeric material in a known manner.

The general process by which the molding and vulcanization of the extra elastomeric mounting material 88 and vulcanization of the tube 18 occurs is well known. However, in one specific instance, the tube 18 was filled with air at a pressure of approximately 80 p.s.i. and the mold 48 was heated to a temperature of approximately 300° F., for several hours. It should be understood that any desired vulcanization process could be used so that the temperatures and duration of the vulcanization process will depend upon the composition of the elastomeric mounting material. In one specific instance, the elastomeric mounting material 88 and the elastomeric material of the tube 18 was neoprene. Of course, other elastomeric materials, including elastomeric mounting materials which do not require vulcanization, could be utilized if desired.

Coupling Component—Second Embodiment

Figure 7:
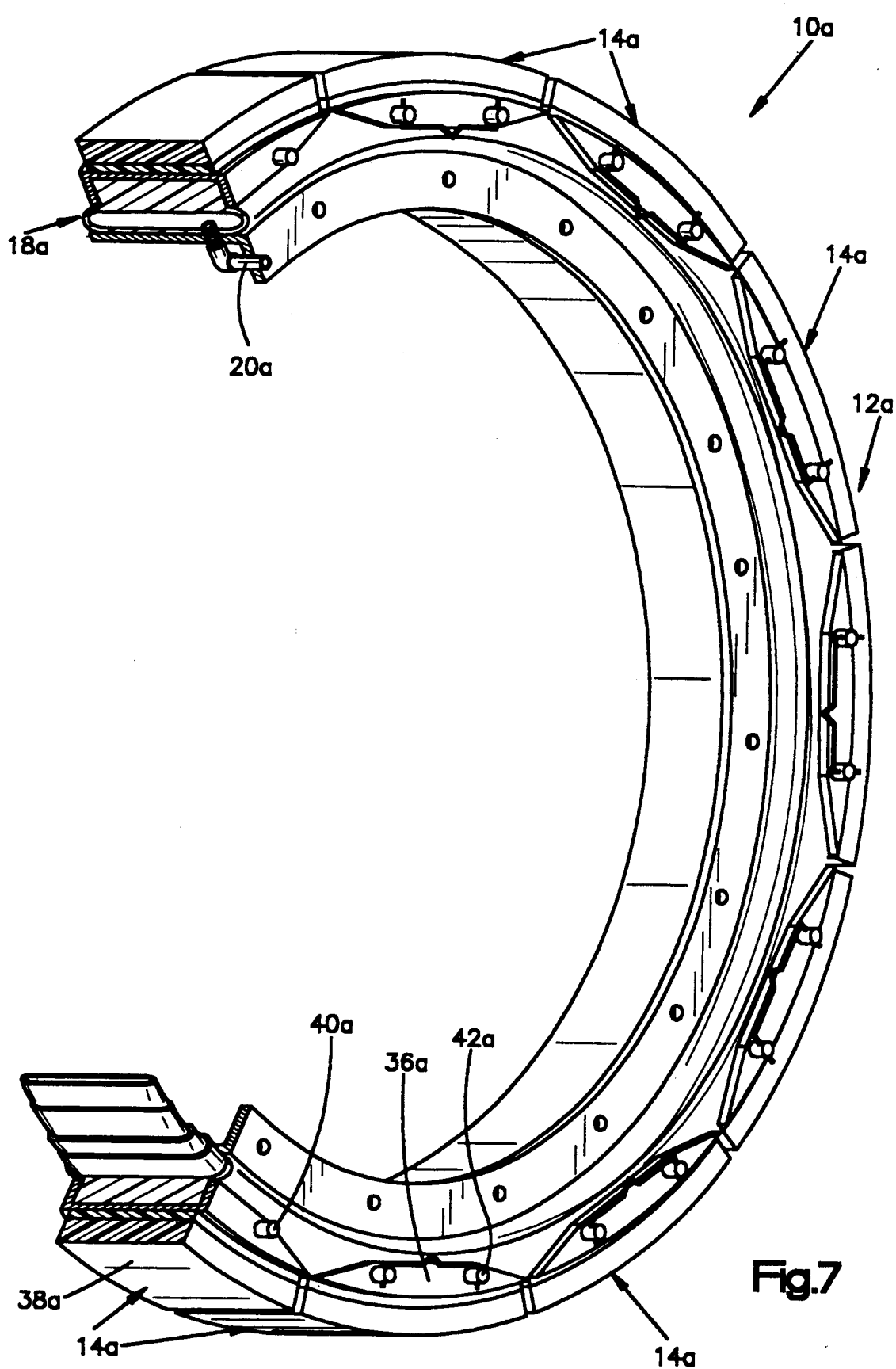
FIG. 7 is a pictorial illustration of a second embodiment of the coupling component.

In the embodiment of the coupling component 10 illustrated in FIG. 1, the tube 18 is expanded radially inwardly to press the friction shoe assemblies 14 against the outer side surface of a drum. However, in the embodiment of the invention illustrated in FIG. 7, the tube is expanded radially outwardly to press the friction shoe assemblies against the inside surface of a hollow drum or other coupling component Since the embodiment of the invention illustrated in FIG. 7 is generally similar to the embodiment of the invention illustrated in FIG. 1, similar numerals will be utilized to identify similar components, the suffix letter "a" being associated with the numerals of FIG. 7 to avoid confusion.

The coupling component 10a includes an annular array 12a of friction shoe assemblies 14a. The friction shoe assemblies 14a are connected with an inflatable tube 18a. When fluid is conducted under pressure through a conduit 20a to the tube 18a, the tube 18a expands radially outwardly to press the friction shoe assemblies 14a against a cylindrical inner side surface of a hollow drum (not shown) forming a second component of the coupling.

The friction shoe assemblies 14a have a metal backing or base plate 36a upon which a generally rectangular pad 38a of friction material is disposed. A pair of torque transmitting elements or pins 40a and 42a releasably connect the friction shoe assembly 14a with the tube 18a. The central portions of the pins 40a and 42a are surrounded by elastomeric mounting material which is connected with the tube 18a. Therefore, torque can be transmitted from the friction pads 38a through the backing plate 36a and pins 40a and 42a to the elastomeric mounting material. The torque or force is transmitted from the elastomeric mounting material to the tube 18a. In accordance with a feature of this embodiment of the invention and the embodiment of the invention illustrated in FIG. 1, the elastomeric mounting material is molded in place against the backing plate 36a and around the torque transmitting elements or pins 40a and 42a.

The coupling component 10a is fabricated in the same manner as is the coupling component 10. Thus, a mold similar to the mold 48 would be used to hold the components of the coupling component 10a during molding and vulcanization of elastomeric mounting material around the pins 40a and 42a and against the backing plates 36a. Although the mold for the coupling component 10a would be similar to the mold 48, the friction shoe assemblies 14a would be disposed in a radially outwardly facing orientation relative to the mold. Thus, the central axis of the annular mold used in forming the coupling element 10a of FIG. 7 would be to the left as viewed in FIG. 5. The tube 18a would be inflated and expanded radially outwardly to press elastomeric mounting material against the friction shoe assemblies 14a. Upon heating of the mold assembly, the elastomeric mounting material would flow around the pins 40a and 42a and be molded against the pins and the backing plates 36a.

Conclusion

In view of the foregoing description, it is apparent that the present invention provides a new and improved coupling component 10 and a new and improved method of making the coupling component The coupling component 10 has a plurality of friction shoe assemblies 14 connected with an inflatable tube 18 by torque transmitting elements 40 and 42. When the coupling component 10 is to be constructed, the tube 18 is placed in a mold 48. A plurality of friction shoe assemblies 14 are placed in the mold 48 with torque transmitting elements 40 and 42 on the friction shoe assemblies adjacent to elastomeric mounting material 88.

After the tube 18 and friction shoe assemblies 14 have been placed in the mold 48 and the mold closed, fluid pressure is utilized to expand the tube and press the elastomeric mounting material 88 against the torque transmitting elements 40 and 42 connected with the friction shoe assemblies. The elastomeric mounting material 88 is molded around the torque transmitting elements 40 and 42 to interconnect the friction shoe assemblies 14 and the tube 18. The inflatable tube of the coupling component may be expanded radially inwardly (FIG. 1) or radially outwardly (FIG. 7).

Having described specific preferred embodiments of the invention, the following is claimed:

1. A method of assembling a coupling component having a plurality of friction shoes attached to an annular tube, said method comprising:

providing an annular tube which is at least partially formed of uncured elastomeric material;

assembling a plurality of friction shoes with backing plates having flanges projecting to one side of the shoes and pins extending through aligned holes in the flanges;

positioning the assembled shoes and pins in a first mold part of a multi-part mold;

placing the tube in the first mold part;

placing another mold part in position with the first mold part to at least partially form an enclosed mold cavity containing the tube, assembled shoes and pins and securing the mold parts together;

heating the mold and tube to a curing temperature;

inflating the tube to radially expand the tube to cause elastomeric material to flow around the pins within the mold cavity and into contact with the backing plate of the friction shoe assemblies; thereby interconnecting the tube and friction shoe assemblies; and removing the interconnected tube and friction shoe assemblies from the mold.

2. A method as set forth in claim 1 wherein said step of positioning the assembled shoes and pins in the first mold part of the multi-part mold includes positioning an end of each pin into an opening in the first mold part to locate the friction shoe assemblies in an annular array.

3. A method as set forth in claim 1 wherein said step of positioning the assembled shoes and pins in the first mold part of the multi-part mold includes providing ribs which extend in a radial direction relative to the annular array of friction shoe assemblies and project between ends of adjacent friction shoe assemblies.

4. A method as set forth in claim 1 wherein said step of inflating the annular tube to expand the tube includes expanding the tube radially inwardly.

5. A method as set forth in claim 1 wherein said step of inflating the annular tube to expand the tube includes expanding the tube radially outwardly.

6. A method as set forth in claim 1 further including the step of placing a plurality of bodies of elastomeric material in the first mold part, said step of inflating the tube to radially expand the tube and cause the elastomeric material to flow around the pins and into contact with the backing plates of the friction shoe assemblies including pressing the bodies of elastomeric material against the friction shoe assemblies.

7. A method as set forth in claim 1 wherein said step of providing an annular tube includes providing an annular tube having a thick wall portion at least partially formed of uncured elastomeric material, said steps of placing the tube in the first mold part and positioning the assembled shoes and pins in the first mold part includes arranging the tube and assembled shoes and pins with the thick wall portion of the tube adjacent to the assembled shoes and pins.

8. A method as set forth in claim 1 further including the step of mounting the tube on a rigid annular rim member, said step of placing the tube in the first mold part including placing the tube and rim member in the first mold part.

9. A method of forming a coupling component, said method comprising the steps of placing mounting material in a mold, placing an inflatable tube in the mold, placing a plurality of friction shoe assemblies having torque transmitting elements in the mold with an amount of the mounting material adjacent to the torque transmitting elements, the amount being sufficient to allow the mounting material to flow at least part way around the torque transmitting elements when the mounting material is pressed against the torque transmitting elements, said steps of placing the tube, mounting material and friction show assemblies in the mold including placing the tube, mounting material and friction shoe assemblies in the mold with at least a portion of the mounting material located between the friction shoe assemblies and tube, conducting fluid pressure to the tube, expanding the tube under the influence of the fluid pressure to press the mounting material against the torque transmitting elements, and molding the mounting material at least part way around the torque transmitting elements while maintaining fluid pressure in the tube, each of the friction shoe assemblies includes a backing plate and a friction pad, the torque transmitting elements including a plurality of pins connected with the backing plates at opposite end portions of the pins and with central portions of the pins spaced from the backing plates, said step of molding the mounting material at least part way around the torque transmitting elements includes molding the mounting material around the central portions of the pins, said method further including mounting the plurality of friction shoe assemblies on a plurality of bodies of mounting material, said steps of placing the mounting material in the mold and placing the plurality of friction shoe assemblies in the mold including placing the plurality of bodies of mounting material in the mold with the plurality of friction shoe assemblies mounted on the plurality of bodies of mounting material.

10. A method of forming a coupling component having a plurality of friction shoe assemblies connected with an inflatable tube by torque transmitting elements, said method comprising the steps of placing the inflatable tube in a mold, placing the plurality of friction shoe assemblies having torque transmitting elements in the mold with an amount of mounting material sufficient to allow the mounting material to flow at least part way around the torque transmitting elements when the mounting material is pressed against the torque transmitting elements, said steps of placing the tube and friction shoe assemblies in the mold including placing the tube and friction shoe assemblies in the mold with the mounting material between the friction shoe assemblies and tube, each of the friction shoe assemblies including a backing plate and a friction pad, the torque transmitting elements being connected with the backing plates with portions of the torque transmitting elements spaced from the backing plates, conducting fluid pressure to the tube, expanding the tube under the influence of the fluid pressure to press the mounting material against the torque transmitting elements, and molding the mounting material at least part way around the torque transmitting elements while maintaining fluid pressure in the tube, said step of molding the mounting material at least part way around the torque transmitting elements includes molding the mounting material around portions of the torque transmitting elements spaced from the backing plates and molding the mounting material against the backing plates of the friction shoe assemblies with mounting material disposed between portions of the torque transmitting elements and the backing plates.

11. A method as set forth in claim 10 wherein said method further includes mounting the plurality of friction shoe assemblies on a plurality of bodies of mounting material, said step of placing the plurality of friction shoe assemblies in the mold including placing the plurality of bodies of mounting material in the mold with the plurality of friction shoe assemblies mounted on the plurality of bodies of mounting material.

12. A method of forming a coupling component having an annular inflatable tube connected with and disposed between an annular rim and an annular array of friction shoe assemblies having torque transmitting elements, said method comprising the steps of placing the friction shoe assemblies in the annular array in a mold, placing the annular rim in the mold, placing the annular inflatable tube in the mold, said steps of placing the friction shoe assemblies and annular inflatable tube in the mold including providing an amount of mounting material in the mold adjacent to the friction shoe assemblies sufficient to allow the mounting material to flow at least part way around the torque transmitting elements when the mounting material is pressed against the torque transmitting elements, said steps of placing the friction shoe assemblies, annular rim and annular inflatable tube in the mold including positioning the annular array of friction shoe assemblies, annular rim and annular inflatable tube in a coaxial relationship in the mold with the annular inflatable tube disposed between the annular rim and the annular array of friction shoe assemblies, conducting fluid pressure into the annular inflatable tube, radially expanding the annular inflatable tube under the influence of the fluid pressure in the annular inflatable tube, pressing the mounting material against the friction shoe assemblies under the influence of the fluid pressure in the annular inflatable tube, molding the mounting material at least part way around the torque transmitting elements while performing said step of pressing the mounting material against the friction shoe assemblies, pressing the annular inflatable tube against the annular rim under the influence of the fluid pressure in the annular inflatable tube, and connecting the annular inflatable tube with the annular rim while performing said step of pressing the annular inflatable tube against the annular rim under the influence of the fluid pressure in the tube and while performing said step of pressing the mounting material against the friction shoe assemblies.

13. A method as set forth in claim 12 wherein said steps of placing the annular rim in the mold and placing the annular inflatable tube in the mold include mounting the annular inflatable tube on the annular rim outside of the mold and, thereafter, placing the rim and tube in the mold with the tube mounted on the rim.

14. A method as set forth in claim 12 wherein the annular inflatable tube has a radially inwardly facing side and a radially outwardly facing side, said steps positioning the friction shoe assemblies, annular rim and annular inflatable tube in the mold including positioning them in the mold with the friction shoe assemblies in the annular array adjacent to one of the radially facing sides of the annular inflatable tube and with the rim adjacent to the other radially facing side of the annular inflatable tube.

15. A method as set forth in claim 12 wherein said step of providing the amount of mounting material in the mold includes the step of placing a plurality of bodies of mounting material in the mold, said steps of placing the annular inflatable tube, mounting material and friction shoe assemblies in the mold including positioning the plurality of bodies of mounting material in an annular array in the mold with the plurality of bodies of mounting material between the friction shoe assemblies and tube.

16. A method as set forth in claim 12 wherein said step of radially expanding the tube includes expanding the tube radially inwardly.

17. A method as set forth in claim 12 wherein said step of radially expanding the tube includes expanding the tube radially outwardly.

18. A method as set forth in claim 12 wherein said step of providing the amount of mounting material in the mold includes the step of placing at least one body of mounting material in the mold, said steps of placing the annular inflatable tube, friction shoe assemblies and at least one body of mounting material in the mold including placing the annular inflatable tube, friction shoe assemblies and at least one body of mounting material in the mold with at least a portion of the mounting material located between the annular inflatable tube and friction shoe assemblies.

19. A method as set forth in claim 12 wherein the annular inflatable tube includes a relatively thick side wall portion at least partially formed of the mounting material, said steps of placing the annular inflatable tube and the plurality of friction shoe assemblies in the mold and providing the amount of mounting material in the mold include placing the annular inflatable tube and friction shoe assemblies in the mold with the thick side wall portion of the annular inflatable tube adjacent to the friction shoe assemblies.

20. A method as set forth in claim 12 wherein the torque transmitting elements include a plurality of releasable members, said step of molding the mounting material at least part way around the torque transmitting elements includes molding the mounting material around the members to releasable connect the friction shoe assemblies with the annular inflatable tube.

21. A method as set forth in claim 12 wherein said step of connecting the annular inflatable tube with the annular rim includes bonding the annular inflatable tube to the annular rim while performing said step of molding the mounting material at least part way around the torque transmitting elements.

22. A method as set forth in claim 12 wherein the torque transmitting elements include a plurality of pins connected with the backing plates of the friction shoe assemblies at opposite end portions of the pins and with central portions of the pins spaced from the backing plates, said step of molding the mounting material at least part way around the torque transmitting elements includes molding the mounting material around the central portions of the pins.

23. A method as set forth in claim 12 further including the step of mounting the plurality of friction shoe assemblies on a plurality of bodies of mounting material, said steps of placing the plurality of friction shoe assemblies in the mold and providing the amount of mounting material in the mold including placing the plurality of bodies of mounting material in the mold with the plurality of friction shoe assemblies mounted on the plurality of bodies of mounting material in the mold with the plurality of friction shoe assemblies mounted on the plurality of bodies of mounting material.

24. A method as set forth in claim 12 further including placing a plurality of blocking elements between end portions of the friction shoe assemblies to block the molding of mounting material in spaces between end portions of the friction shoe assemblies.

25. A method as set forth in claim 12 wherein the torque transmitting elements of the friction shoe assemblies include pins having first and second end portions with a central portion between the first and second end portions of the pins, said step of placing the friction shoe assemblies in the mold including positioning the friction shoe assemblies in the mold with the first end portions of the pins in engagement with openings in a first portion of the mold.

26. A method as set forth in claim 25 further including the step of positioning openings in a second portion of the mold in engagement with the second end portions of the pins after performing said step of positioning the friction shoe assemblies in the mold with the first end portions of the pins in engagement with openings in a first portion of the mold.

27. A method as set forth in claim 26 wherein said step of molding mounting material at least part way around the torque transmitting elements includes molding the mounting material around the central portions of pins while maintaining the first and second end portions of the pins free of engagement with the mounting material.

28. A method as set forth in claim 12 wherein said steps of placing the annular rim and annular inflatable tube in the mold are performed prior to performance of said step of placing the friction shoe assemblies in the annular array in the mold.

* * * * *

UNITED STATES PATENT AND TRADEMARK OFFICE
CERTIFICATE OF CORRECTION

PATENT NO. : 5,057,178
DATED : October 15, 1991
INVENTOR(S) : James M. Latsko

It is certified that error appears in the above-identified patent and that said Letters Patent is hereby corrected as shown below:

Column 9, line 55, claim 9, delete "show" and insert --shoe--.

Column 12, line 16, claim 20, change "releasable" to --releasably--.

line 41, claim 23, delete "in the mold with the" and insert --.--.

line 42, delete "plurality of friction shoe assemblies mounted on the".

line 43, delete "plurality of bodies of mounting material."

Signed and Sealed this

Second Day of March, 1993

Attest:

STEPHEN G. KUNIN

*Attesting Officer*    *Acting Commissioner of Patents and Trademarks*